United States Patent [19]

Shinoda et al.

[11] 4,294,334

[45] Oct. 13, 1981

[54] AXLE HOUSING SUB-ASSEMBLY

[75] Inventors: Akibumi Shinoda; Masao Nakane, both of Handa, Japan

[73] Assignee: Kabushiki Kaisha Toyoda Jidoshokki Seisakusho, Kariya, Japan

[21] Appl. No.: 45,814

[22] Filed: Jun. 5, 1979

[30] Foreign Application Priority Data

Jun. 15, 1978 [JP] Japan .............................. 53-83144[U]

[51] Int. Cl.³ ........................ B60T 1/06; F16D 55/36
[52] U.S. Cl. .................................. 188/18 A; 188/71.5; 188/366; 308/210
[58] Field of Search .................... 188/18 A, 71.5, 366, 188/72.4, 73.2; 308/212–214, 210–211, 190–191

[56] References Cited

U.S. PATENT DOCUMENTS 2,940,549  6/1960  Hause et al. .................... 188/366 X
3,061,048  10/1962  Alsobrooks et al. ............. 188/18 A Primary Examiner—Douglas C. Butler
Attorney, Agent, or Firm—Sughrue, Mion, Zinn, Macpeak & Seas

[57] ABSTRACT

An axle shaft, a piston holder, an axle housing and associated components are preliminarily assembled as a unit and the unit is inserted into a differential housing in one of the steps in an assembly line operation for a heavy load vehicle. The axle shaft has a splined portion engaging the gear box and is supported by bearings in the piston holder and axle housing.

7 Claims, 4 Drawing Figures

AXLE HOUSING SUB-ASSEMBLY

BACKGROUND OF THE INVENTION

The present invention relates to a brake apparatus for a heavy vehicle which requires a large braking force for stopping. More particularly, this invention relates to an improvement in a disc braking apparatus of the type in which a plurality of stationary discs mounted axially movably in an axle housing and a plurality of rotary discs mounted axially movably along an axle shaft driven through a ring gear of a gear box are arranged alternatively to the stationary discs in an axle housing. The rotary discs are urged against the stationary discs respectively by pressure from an hydraulic piston provided in the same axle housing, to obtain a frictional braking force.

An assembling operation of the conventional braking apparatus of the type mentioned above is performed through three steps.

In order to describe these three steps and to clarify the improvement according to the present invention, reference is made to FIG. 2, showing a typical example of the conventional brake system for heavy vehicle such as a fork-lift truck shown in FIG. 1.

In FIG. 2, a piston holder 2 has an annular piston 9, to be mounted, and an axle housing 1 in which axially movably stationary discs 4 are mounted following separate preparation and then they are assembled in succession to a differential housing 17 by bolts 18. In this case, an axle shaft 3 having a spline structure onto which rotary discs 5 are mounted for axial movement, extends from the differential housing and is supported by bearings 12 fixed in the axle housing 1. That is, in the conventional brake apparatus, the stationary discs 4 and the rotary discs 5, both of which are disposed alternatively in the axle housing 1, and the hydraulic piston 9 for urging the stationary discs 4 against the rotary discs 5 are assembled simultaneously with an assembling operation of the axle housing 1 and the piston holder 2 to the differential housing 17.

As is well known, the assembly of the piston holder and axle housing to the differential housing is generally performed in one of the steps of a vehicle assembly line operation. It requires considerably skilled labour to perform the assembly of the brake system simultaneously with the assembly of the axle housing and the axle shaft within a given time during the line operation. Even given a sufficient level of skill, it is still difficult to perform the task, causing problems such as degraded preciseness of assembly, delays on the line, and the like to occur.

SUMMARY OF THE INVENTION

The present invention is intended to eliminate the problems inherent to the assembling operation of the conventional brake system in the assembly line operation of a vehicle.

An object of the present invention is to provide a sub-assembly of an axle shaft, a piston holder, a brake system and an axle housing in which the axle shaft and the brake mechanism including a hydraulic system, brake or stationary discs, the abutting disc or rotary discs are preliminarily assembled as a unit. By preliminarily assembling the axle shaft, the position holder, the brake mechanism and the axle housing as a unit or a sub-assembly, it becomes much easier to mount it to the differential housing during the vehicle assembly line operation.

DETAILED DESCRIPTION OF PREFERRED EMBODIMENT

Figure 1:
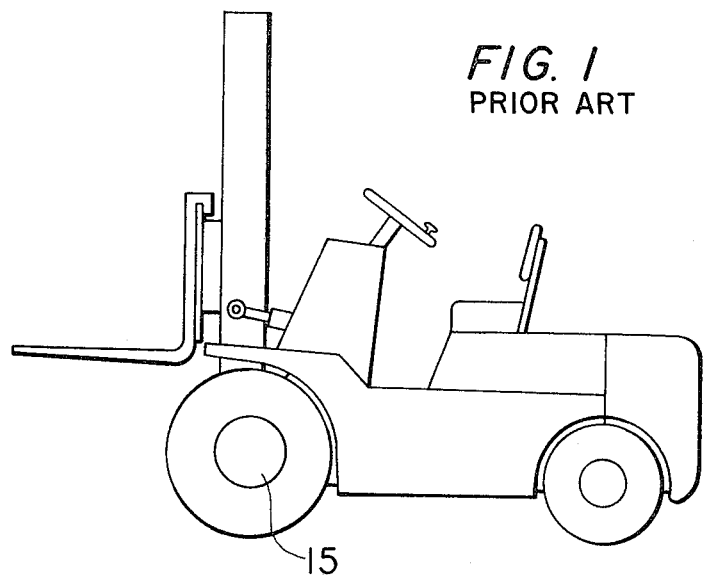
FIG. 1 is a side view of a fork-lift truck as an example of a heavy load vehicle.
Figure 2:
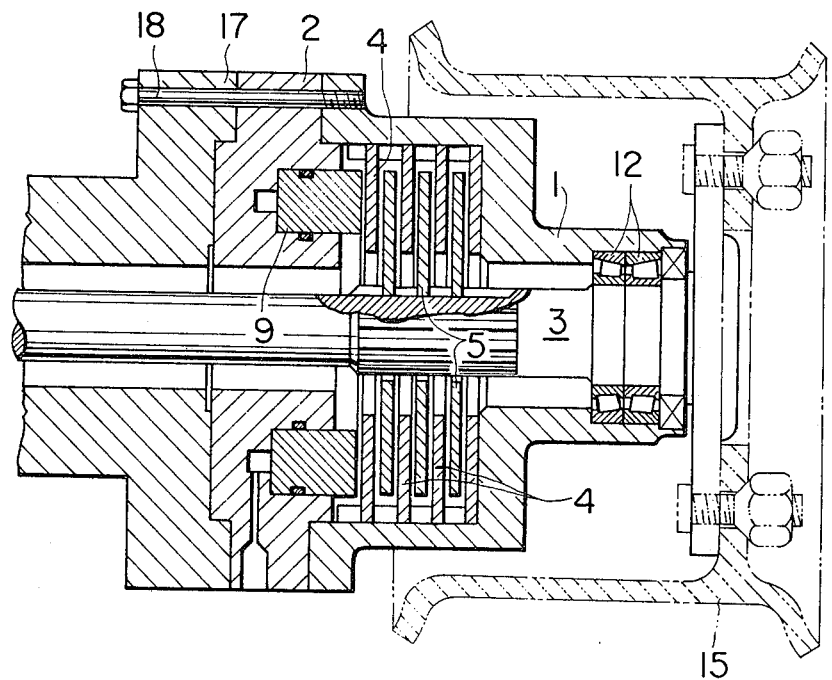
FIG. 2 shows in partial cross section, a typical example of the conventional axle and brake mechanism.
Figure 3:
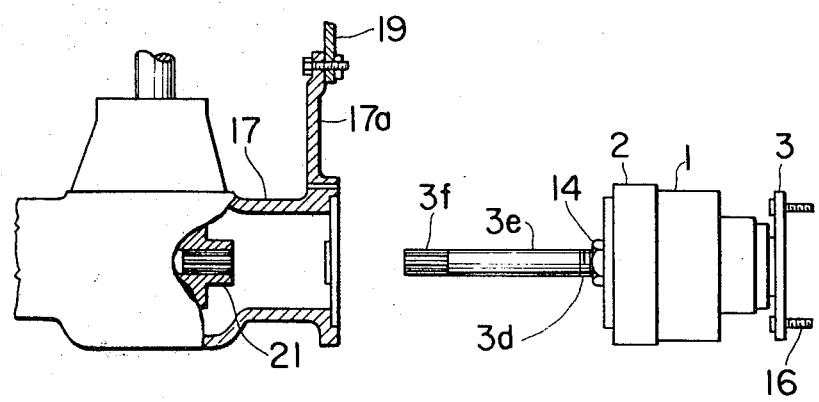
FIG. 3 is a schematic illustration of an embodiment of the present invention.

In FIG. 3, a differential housing is shown partially in cross section. The right hand portion is designated by a reference numeral 17, which houses a conventional gear assembly, in which only a ring gear 21 is shown in cross section. A sub-assembly according to the present invention is shown in the right hand portion of FIG. 3. The differential housing 17 is fixedly secured to a vehicle chassis 19 by flanges 17a thereof. The sub-assembly as shown in FIG. 4 comprises an axle shaft 3 having a splined inner end 3f, an axle housing 1 and a piston holder 2, the latter two being supported on the axle shaft 3 by a pair of truncated-conical roller bearings 12 and 13 provided at both end portions of the sub-assembly, and a nut 14.

As seen in FIG. 3, it is apparent that the present sub-assembly can be mounted to the differential housing 17 by merely inserting and bolting the axle shaft 3 into the differential housing 17 so that the splined end 3f of the axle shaft meshes with a spline provided in a ring gear 21 housed in the differential housing 17.

Figure 4:
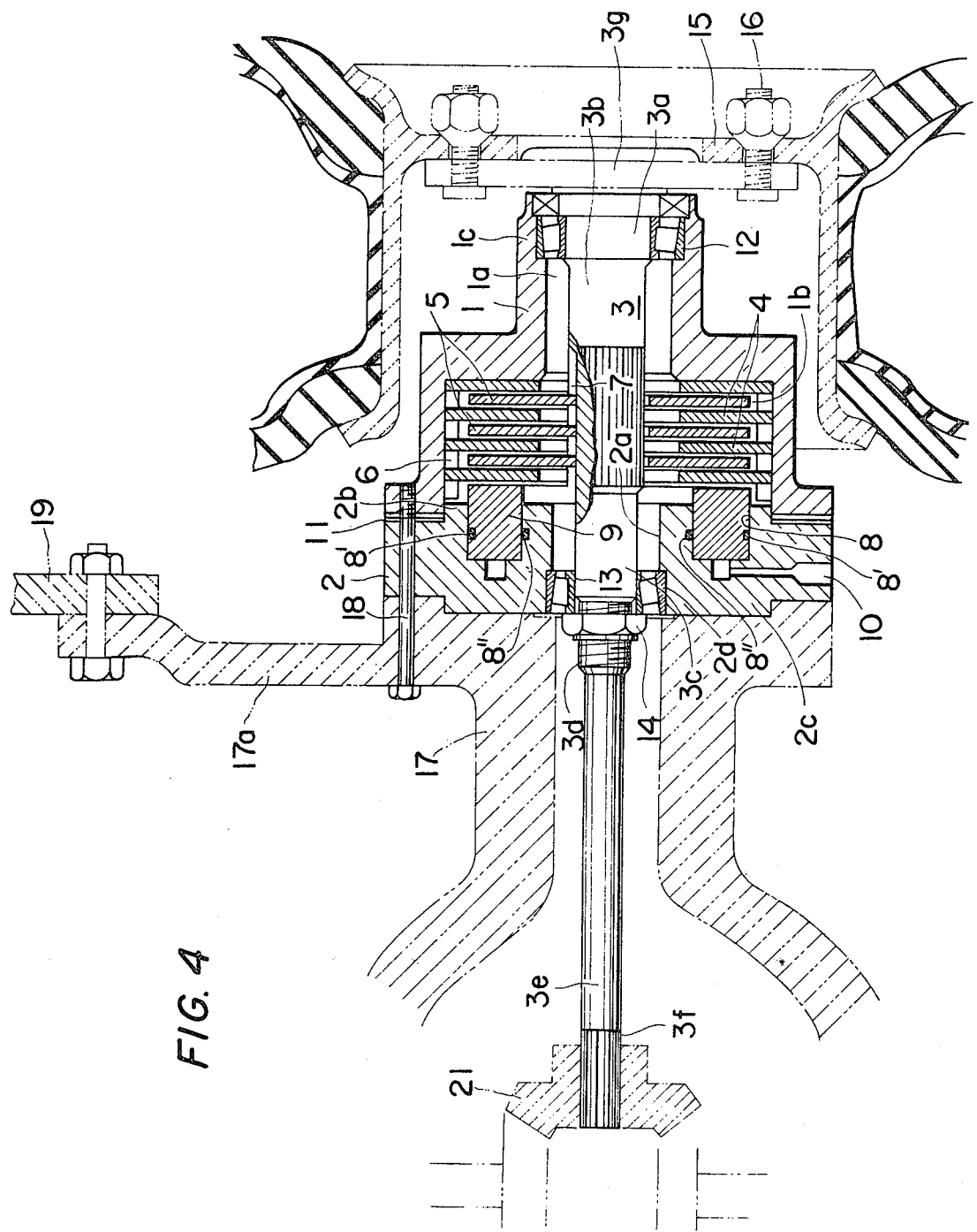
FIG. 4 is a partial cross section of the embodiment in FIG. 2.

Referring to FIG. 4 which shows, in partial cross section, the present sub-assembly in detail when bolted to the differential housing 17, the piston holder 2 is in the form of a disc having a central through-hole 2a and has shoulders 2b and 2c on opposite sides thereof. The central through-hole 2a is formed with a shoulder 2d in the side of the differential housing 17 and a truncated-conical, roller bearing 13 is fixedly secured thereto.

The piston holder 2 is also formed with an annular groove 8 in the side opposite the differential housing 17, in which an annular piston 9 is fluid tightly received using a pair of annular O-rings 8', 8". The annular piston 9 is adapted to be actuated by fluid pressure applied through a radial port 10 of the piston holder 2, which communicates with a bottom of the groove 8.

The axle housing 1 is coaxially arranged with the piston holder 2. The axle housing 1 has a stepped through-hole, portions of which having a smaller diameter and a larger diameter being designated by reference numerals 1a and 1b, respectively. A truncated-conical, roller bearing 12 is provided in a shoulder 1c at an outer end of the smaller diameter chamber 1a of the axle housing 1. The axle shaft 3 passes through the through-hole. The axle shaft 3 has four sections, an end section 3a, a brake section 3b, reduced diameter section 3c, and an extension section 3e. The length of the section 3b is substantially equal to an axial length of the axle housing 1. The length of the section 3c is substantially equal to the thickness of the piston holder 2. The end section 3a of the axle shaft 3 is supported rotatably by the bearing 12 secured to the shoulder 1c at the outer end of the smaller diameter chamber 1a of the axle housing 1. The end section 3a has a step which engages with a lateral surface of an inner ring of the bearing 12 to prevent the inward movement of the shaft 3. The end section 3a is provided with an integral axle disc plate 3g to which a tire wheel 15 is mounted by bolts and nuts 16. The section 3b of the axle shaft 3 to be disposed in the enlarged chamber 1b of the axle housing 1 is formed with a plurality of axially extending grooves 7 which receive toothed inner peripheral portions of rotary disc plates 5 such that the rotary plates can move axially in the enlarged chamber 1b of the axle housing 1 while relative rotation thereof with respect to the axle shaft 3 is prevented. Hence, the rotary plates 5 rotate with the shaft 3 and are axially movable during braking.

An inner peripheral surface of the enlarged chamber 1b of the axle housing is formed with a plurality of axially extending grooves 6 which receive toothed outer peripheral portions of brake disc plates 4 each having a center hole whose diameter is large enough to permit a free rotation of the axle shaft section 3b. Hence, the brake disc plates 4 are prevented from rotation with respect to the axle housing 1 while axial movement thereof is permitted.

The brake disc plates 4 are alternately arranged with respect to the rotary disc plates 5 in the enlarged chamber 1b of the axle housing 1.

The piston holder 2 is provided with shoulder portions 2b and 2c in the opposite sides thereof respectively and positioned against the axle housing 1 such that the enlarged chamber 1b fits on the shoulder 2b through a spacer 11, if necessary. The center hole of the piston holder 2 fixedly receives the roller bearing 13 through which the section 3d of the axle shaft 3 passes. The inner end portion of the section 3d is supported rotatably while being prevented from outwardly moving axially, by means of the nut 14 engaging the threaded portion as shown. The shoulder 2c of the piston holder 2 is used to facilitate a centering operation with respect to the differential housing 17 is assembly line stage.

The annular piston 9 in the piston holder 2 is normally biased to the position shown by a suitable spring means (not shown) and is actuated by a suitable hydraulic pressure applied through the port 10 to move towards the brake disc plates 4 against the spring force. The movement of the piston 9 is transmitted through the brake discs 4 to the rotary disc plates 5 to thereby produce a braking force for the axle shaft 3 due to friction between the rotary disc plates 4 and the brake disc plate 5.

An end of the section 3c of the axle shaft 3 is formed with a thread 3d to which a nut 14 is engaged. The outer size of the nut 14 is selected so as to allow the rotation of the axle shaft 3 with an inner ring of the bearing 13 while tightening the axle shaft against the inner ring and when tightened. Therefore, by tightening the nut 14 on the thread 3d, and by using the suitable spacer 11 between the piston holder 2 and the axle housing 1, the piston holder and axle housing are united through the axle shaft 3 is a sub-assembly.

The extension section 3e of the axle shaft 3 is formed with splines 3f to be inserted into the ring gear 21 in the differential housing 17 to form a spline engagement therewith.

Therefore, the assembling step of the axle housing 1 and the associated components to the differential housing 17 is merely the insertion of the extension section 3e of the sub-assembly into the differential housing 17 with alignment assured by the shoulder 2c of the piston holder 2 and a corresponding shoulder formed in an outer surface of the differential housing 17. The final step is to tighten the elements by bolts 18.

An example of the assembling operation of the sub-assembly according to the present invention will now be described. First, the roller bearings 12 and 13 are pressure fitted to the shoulder 1c of the axle housing 1 and the shoulder 2d of the piston holder 2, respectively. The piston 9 is inserted into the annular groove 8 of the piston holder 2 using the annular O-rings 8',8''. Then, the axle shaft 3 is inserted into the roller bearing 12 until the step portion of the end section 3a thereof contacts with the inner ring of the roller bearing 12.

Next, the brake disc plates 4 and the rotary disc plates 5 are alternatively inserted into the chamber 1b of the axle housing 1. The insertion takes place such that the outer peripheries of the brake disc plates 4 are received in the axial grooves 6 formed in the inner wall of the chamber 1b and the inner peripheries of the rotary disc plates 5 are received in the axial grooves 7 of the axle shaft 3.

Thereafter, the piston holder 2 assembled previously with the roller bearing 13 and the piston 9 is put on the axle shaft 3 through the spacer 11 until the end of the reduced diameter section 3c of the shaft fits in the bearing 13 and the shoulder 2b fits in the chamber 1b of the axle housing 1. Finally, the sub-assembly is tightened as a unit by using the nut 14.

In the above description, the present invention has been described as being applied to the semi-floating type supporting structure. It should be noted, however, that the present invention may be applied to full floating type structures which are generally employed in heavy load vehicles and in which the full load is supported through the axle housings. As described, the present invention provides a sub-assembly of the axle system including the axle housing and the brake mechanism housed therein. It can be assembled separately from the main assembly line of the vehicle without the time constraints imposed in the line operation. Therefore, the preciseness of the elements in the sub-assembly is facilitated. With the present sub-assembly, the number of mounting steps of the axle housing and the associated components onto the differential housing during the vehicle assembly line operation is reduced to a single step. It is apparent that when any of the components is damaged, a simple exchange of sum-assemblies is all that is required. Furthermore, the present invention is advantageous in that the step of adjusting the braking force of the disc brake assembly can be performed prior to mounting the same onto the differential housing.

What is claimed is:

1. A disc brake system sub-assembly for use in a heavy load vehicle comprising; an axle shaft having a spline portion on one end thereof, a differential gear attached to said axle shaft at said spline portion, an axle housing having a through-hole, bearing means fixed at one end of said through-hole, for rotatably supporting said axle shaft, a plurality of rotary disc plates engaging said axle shaft for rotation therewith, said rotary disc plates axially movable within said through-hole of said axle housing, a plurality of stationary disc plates disposed in said axle housing for axial movement within said through-hole, said stationary disc plates being arranged alternately with said rotary disc plates, piston means adapted to close the other end of said through-hole, said piston means urging said stationary disc plates against said rotary disc plates when actuated and, means for joining said axle housing and said piston means as a unit, said sub-assembly further comprising further bearing means fixed in said piston means for rotatably supporting said axle shaft at the other end of said through-hole.

2. A disc brake system sub-assembly for use in a heavy load vehicle comprising; an axle shaft having a spline portion on one end thereof, a differential gear attached to said axle shaft at said spline portion, an axle housing having a through-hole, bearing means fixed at one end of said through-hole, for rotatably supporting said axle shaft, a plurality of rotary disc plates engaging said axle shaft for rotation therewith, said rotary disc plates axially movable within said through-hole of said axle housing, a plurality of stationary disc plates disposed in said axle housing for axlial movement within said through-hole, said stationary disc plates being arranged alternately with said rotary disc plates, piston means adapted to close the other end of said through-hole, said piston means urging said stationary disc plates against said rotary disc plates when actuated and, means for joining said axle housing and said piston means as a unit, said joining means comprising a threaded portion on said axle shaft, further bearing means disposed in said piston means for supporting said axle shaft, and a nut engaging said threaded portion and said further bearing means to permit rotation of said axle shaft in said further bearing means while securing said shaft thereto.

3. The assembly as defined in claim 1 or 2 wherein said further bearing means comprises roller bearings.

4. The assembly as define in claim 1 or 2 further comprising an axle disc plate secured to the other end of said axle shaft, said axle disc plate coupling said axle shaft to a tire wheel.

5. The assembly as defined in claim 1 wherein said means for joining said axle housing and said piston means comprises a threaded portion on said axle shaft, said further bearing means being disposed in said piston means for supporting said axle shaft and, a nut engaging said threaded portion and said further bearing means to permit rotation of said axle shaft in said further bearing means while securing said shaft thereto.

6. The assembly of claim 5 or 2 wherein said further bearing means comprises a roller bearing having inner and outer rings rotatable about a bearing surface, and wherein said nut engages said inner ring to couple said axle shaft thereto to allow movement of said axle and said inner ring relative to said piston means.

7. The assembly of claims 1, 5 or 2 further comprising spacer means disposed between said axle housing and said piston means.

* * * * *